(12) United States Patent
Wray et al.

(10) Patent No.: US 7,882,550 B2
(45) Date of Patent: Feb. 1, 2011

(54) CUSTOMIZED UNTRUSTED CERTIFICATE REPLICATION

(75) Inventors: John C. Wray, Chelmsford, MA (US); Andrew S. Myers, Wayland, MA (US)

(73) Assignee: International Business Machines Corporation, Armonk, NY (US)

( * ) Notice: Subject to any disclaimer, the term of this patent is extended or adjusted under 35 U.S.C. 154(b) by 1066 days.

(21) Appl. No.: 11/618,149

(22) Filed: Dec. 29, 2006

(65) Prior Publication Data

US 2008/0163346 A1 Jul. 3, 2008

(51) Int. Cl.
- G06F 7/04 (2006.01)
- G06F 15/16 (2006.01)
- G06F 17/30 (2006.01)
- H04L 29/06 (2006.01)

(52) U.S. Cl. .......................... 726/6; 380/251
(58) Field of Classification Search ................... 726/18, 726/6; 713/158, 193; 380/251
See application file for complete search history.

(56) References Cited

U.S. PATENT DOCUMENTS

| | | | |
|---|---|---|---|
| 6,442,688 B1 * | 8/2002 | Moses et al. ................ | 713/158 |
| 6,845,383 B1 | 1/2005 | Kraenzel et al. | |
| 2003/0212888 A1 * | 11/2003 | Wildish et al. ............... | 713/158 |
| 2005/0257072 A1 * | 11/2005 | Cross et al. .................. | 713/193 |
| 2009/0113543 A1 * | 4/2009 | Adams et al. ................ | 726/18 |

OTHER PUBLICATIONS

Advances in public-key certificate standards; Warwick Ford ; Year of Publication: 1995 ; Special issue: Issues 94 workshop on public key cryptography ; pp. 9-15.*

Adya, Atul, et al; FARSITE: Federated, Available, and Reliable Storage for an Incompletely Trusted Environment; 5th Symposium on Operating Systems Design and Implementation; USENIX Association.

Saito, Yasushi; Optimistic Replication; ACM Computing Surveys, vol. 27, No. 1, Mar. 2005, pp. 42-81.

Zhou, Lidong, et al; COCA: A Secure Distributed Online Certification Authority; ACM Transactions on Computer Systesm, vol. 20, No. 4, Nov. 2002, pp. 329-368.

Dourish, Paul, et al; Extending Document Management Systems with User-Specific Active Proparties; ACM Transactions on Information Systems, vol. 18, No. 2, Apr. 2000, pp. 140-170.

Slik, D.; et al; Comprehensive Security Framework for the Communication and Storage of Medical Images; INSPEC, Proceedings of the SPIE, vol. 5033, pp. 212-223, 2003.

* cited by examiner

*Primary Examiner*—Kambiz Zand
*Assistant Examiner*—Monjour Rahim
(74) *Attorney, Agent, or Firm*—Ayla A. Lari, Esq.; Steven M. Greenberg, Esq.; Carey Rodriguez Greenberg & Paul LLP

(57) ABSTRACT

Embodiments of the invention address deficiencies of the art in respect to electronic messaging security through replicated certificate stores and provide a method, system and computer program product user-specific certificate repository replication. In one embodiment of the invention, a method of replicating with multiple different messaging systems disposed in correspondingly different computing clients, retrieving a local repository of untrusted certificates from each of the different messaging systems during replication, and associating each retrieved local repository with a particular end user can be provided. Moreover, the method can include updating a global repository of untrusted certificates with the untrusted certificates of each local repository while eliminating redundant instances of an untrusted certificate present in different retrieved local repositories.

11 Claims, 2 Drawing Sheets

CUSTOMIZED UNTRUSTED CERTIFICATE REPLICATION

BACKGROUND OF THE INVENTION

1. Field of the Invention

The present invention relates to the field of communications network security and more particularly to electronic messaging security through replicated certificate stores.

2. Description of the Related Art

Security of sensitive information remains a vital concern for any entity that stores and transmits confidential information in secure and insecure networks. Today, there exists a particular concern of securing sensitive information in electronic messaging systems such as E-mail. Electronic messages are often transmitted over public, untrusted networks, creating a significant risk to determine whether the message is authentic or whether it was intercepted and modified. Additionally the risk of message confidentiality exists if an unauthorized party is able to read the contents of the message.

Consequently, entities such as commercial enterprises have been employing various techniques to improve the security of sensitive information contained in electronic messages. In addition to encryption key pairs, digital signature key pairs are generally used to sign electronic messages being sent from one user to another user within a computer network. Verifying signed electronic messages usually require certificates which are typically generated by a trusted certification authority for public keys of private/public key pairs. Thus, a certificate securely binds a public key to the entity that holds the corresponding private key, certifying that the keys are genuinely owned by a trustable source.

Typically, in a secure client-server environment, the client maintains a local repository of certificates replicated from the certificate store of the central server. More particularly, an untrusted certificate store on the client system can be replicated amongst other clients for the same user via the central server—but this replication is done ad hoc. If different users happen to be using the same certificates, the untrusted certificate store for each user must be replicated redundantly on each separate client.

Some clients maintain certificate sharing between users by having a host computing platform-resident repository shared between all users and replicated to all clients; however, in a large diverse user community, this would be impractical due to the size of such a repository. Especially in a system where a single user operates multiple clients, maintaining a separate repository on each client would result in unexpected differences in behavior between the systems since a required certificate might be available in the repository on one client, but not on another client. Additionally, there is no guarantee that a needed certificate will be resident on the client when needed. Thus, these clients must sacrifice memory and system performance due to redundancies and inconsistencies in certificate replication.

BRIEF SUMMARY OF THE INVENTION

Embodiments of the invention address deficiencies of the art in respect to memory fault tolerance, and provide a novel and non-obvious method, system and apparatus for the replication of a user-specific certificate repository. In one embodiment of the invention, a user-specific replication method can be provided. The method can include replicating with multiple different messaging systems disposed in correspondingly different computing clients, retrieving a local repository of untrusted certificates from each of the different messaging systems during replication, and associating each retrieved local repository with a particular end user. Moreover, the method can include updating a global repository of untrusted certificates with the untrusted certificates of each local repository while eliminating redundant instances of an untrusted certificate present in different retrieved local repositories.

In one embodiment of the invention, the method further can include tracking user specific interest data of untrusted certificates for each end user, receiving a request to replicate from a particular one of the messaging systems, associating the request for a particular end user, generating a local repository based upon a tracked user-specific interest data for the particular end user, and returning the local repository to the particular one of the messaging systems during replication.

Moreover, one aspect of the embodiment further can include determining common matching interests among end users according to the tracked user-specific interest data for each end user, and updating the local repository for each end user with replicated additional untrusted certificates based on the tracked user-specific interest data for another end user known to have common matching interests.

In another embodiment of the invention, the method further can include marking one of the untrusted certificates to indicate administratively-specified mandatory replication to a set of all end users, and updating each local repository for each of the end users in the set with replicated additional untrusted certificates based on the marking of administratively-specified mandatory replication.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide a method, system and computer program product for minimizing the redundancy and size of untrusted certificate repositories by creating a subset of untrusted certificates based on a set of user-specific data representing the history each user has in the corresponding certificate. Specifically, a global repository of untrusted certificates can be maintained in a host computing platform. Additionally, for each certificate the host computing platform can maintain a set of user-specific data representing the interest and history associated with individual registered users of the host computing platform. Thereafter, for each user a subset of the global repository can be created by applying a user-specific filtering mechanism to extract a set of certificates targeted to the specific interests of a corresponding user.

Figure 1:
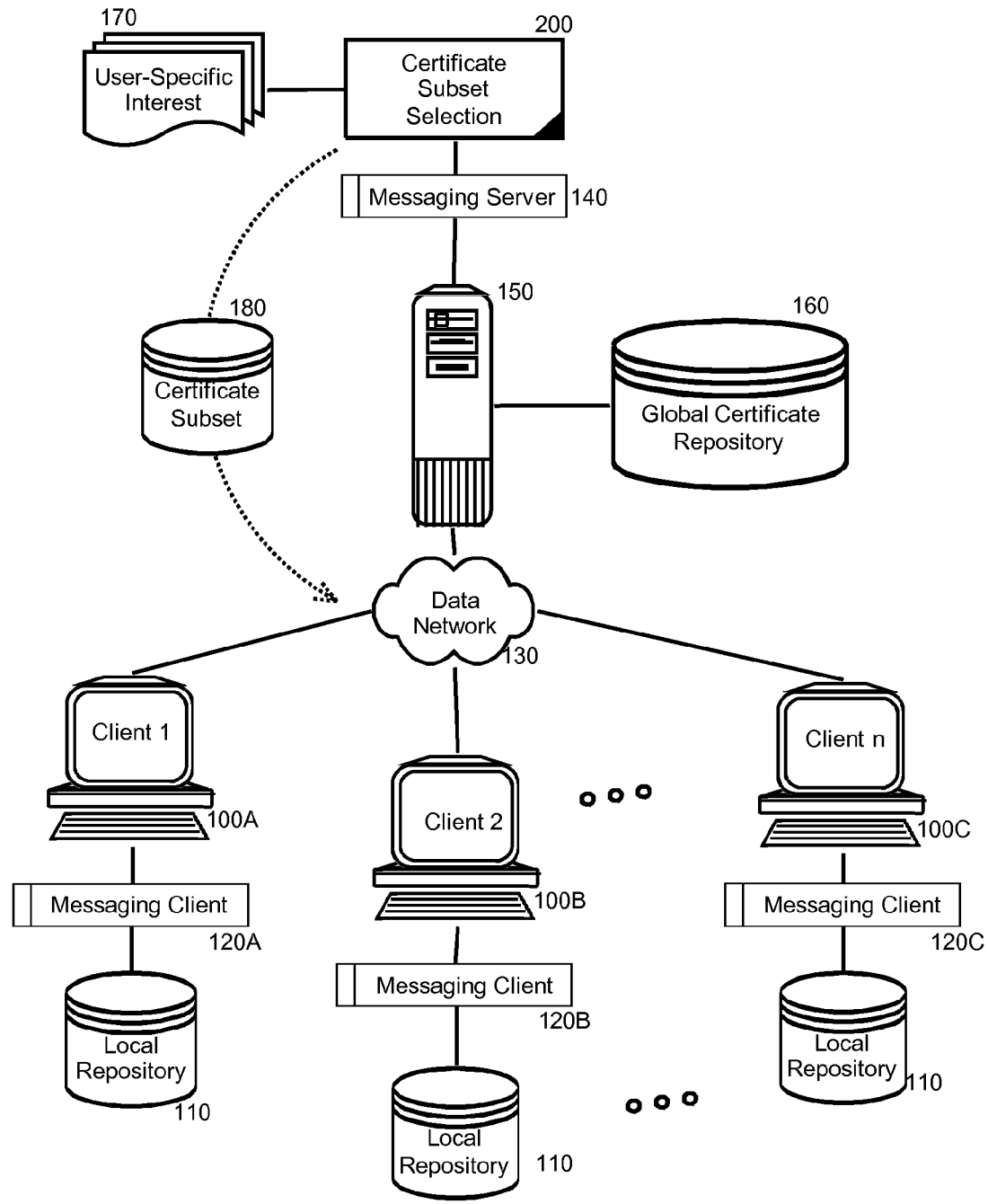
FIG. 1 is a schematic illustration of a user-specific certificate repository replication data processing system; and, FIG. 2 is a flow chart illustrating a process for user-specific certificate subset replication in a user-specific certificate repository replication system.

Consequently, only certificates of interest to the client's user can be replicated and sent to each client. Moreover, since the certificate subset is user-specific, rather than client-specific, all clients operated by the given user replicate the same certificate subset customized according to certificates based on user history. In further illustration, FIG. 1 schematically depicts a user-specific certificate repository replication data processing system that has been configured in accordance with an aspect of the inventive arrangements.

The system can include a host computing platform 150 coupled to one or more computing clients 100A, 100B, 100C over a data communications network 130. Each computing client 100A, 100B, 100C can be coupled to a messaging client 120A, 120B, 120C. The host computing platform 150 can host certificate subset selection logic 200. The certificate subset selection logic 200 can be communicatively linked to a client-resident local repository 110 through a messaging server 140. Likewise, the certificate subset selection logic 200 also can be communicatively linked to a host computing platform-resident global certificate repository 160.

Importantly, the certificate subset selection logic 200 can include program code enabled to create a subset of untrusted certificates 180 from the global certificate repository 160 based on a set of user-specific interest data 170 that represents the history that each user has in the corresponding certificate. Specifically, certificates likely to be of interest to a user associated with one of the messaging clients 120A, 120B, 120C can be replicated between other ones of the messaging clients 120A, 120B, 120C operated by the same user by maintaining and sharing a replica of the local repository 110 on the messaging server 140. It should be noted that optionally, the certificate subset selection logic can be implemented in the client instead of the host computing platform. The information for calculating user-specific interest scores can be maintained on the host computing platform, but the actual subset creation logic and the replication process may be driven by the client locally.

Certificates typically have a finite lifetime, and usually when a certificate nears its expiration the owner of the certificate will obtain a replacement certificate. Having a replicated server-based shared repository means that if one user receives mail from a correspondent containing a new replacement certificate, then that certificate can be added to the global repository during replication and will be available to any other users who wish to exchange messages with that particular correspondent, even if they haven't yet received a message from that particular correspondent containing the new replacement certificate.

A "leakage" mechanism (not shown) further can be provided between users. In the leakage mechanism, one user determining that a given certificate is of interest can be taken as an indication that some other similar users with similar interests may also find the certificate of interest. For example, users working in similar areas of an enterprise are likely to have similar correspondents. Thus, "leakage" also can support security when the client is off-line by predicting the set of certificates each user is likely to need based upon the actual usage patterns of similar users, and to replicate those certificates down to the client user when connected to the network so that those particular certificates will subsequently be available when the user is disconnected.

As such, the leakage mechanism involves determining how similar one user is to another according to their common interests. One way to determine similar common interests includes the use of fully-qualified directory names if the site's directory schema reflects the organizational structure. In this model, users whose names are "close" to one another in the directory tree are considered to have more correspondents in common than users whose names are far removed from one another. Another optional model would be to use groups to infer shared correspondents. In this model, members of a group are considered likely to have correspondents in common.

Regardless of how user-specific interest is calculated, in addition to creating user-specific interest data, aggregate interest data can also be compiled. For example, in a system using organizational directory names, interest data can be constructed for each level in the naming hierarchy between the user and the company root. When deciding which entries to replicate down, the client can calculate a weighted interest score, based on all interest data history that apply to the user, calculated such that history entries corresponding to higher-level (less specific) names are of much less significance than lower (more specific) ones.

For example, if a client operating on behalf of "user_A", whose distinguished directory name is "cn=user_A, ou=New England, ou=NA, ou=sales, o=ACME,c=US" receives an email from a correspondent that contains a certificate, the client can create interest data for the certificate for each of the following namespace nodes:

cn=user_A, ou=New England, ou=NA, ou=sales, o=ACME,c=US ou=New England, ou=NA, ou=sales, o=ACME,c=US ou=NA, ou=sales, o=ACME,c=US ou=sales, o=ACME,c=US o=ACME,c=US The user-specific interest data for the user's full name can indicate greater interest since it is the most precise name. A secure email exchange between a member of the New England sales team and the correspondent can be predictive of future exchanges between those two parties, and also somewhat predictive of exchanges between the correspondent and other members of the New England sales team, but probably less predictive of exchanges between the correspondent and members of the sales team outside New England, and even less predictive of exchanges outside this group. If a history record already exists for user_A for the correspondent at a given namespace node, then it can be updated to indicate a renewed interest by user_A in the correspondent.

When determining whether to replicate this certificate down to client, "user_B", whose distinguished name is cn=user_B. ou=New England, ou=NA, ou=sales, o=ACME, c=US would ignore user_A's own entry, but would take into account the presence of all higher-level entries in calculating an aggregate interest score since these higher-level entries are attached to namespace nodes that form the trailing part of user_B's name. If this score exceeds a threshold value, then the certificate can be replicated down. A further optional capability of the invention can be to allow certificates to be marked to indicate administratively-specified mandatory replication to all clients, regardless of the user identity. This extended feature can permit an administrative user to publish certain certificates to all clients. Typically, the client user cannot have administrative level access to implement this extended feature. Permitting administrative user to indicate that certain certificates should be replicated to all or a specified subset of client users—regardless of calculated user-specific interest—can be useful to permit administrative users to pre-distribute certificates that may be eventually needed by a significant number of users.

Figure 2:
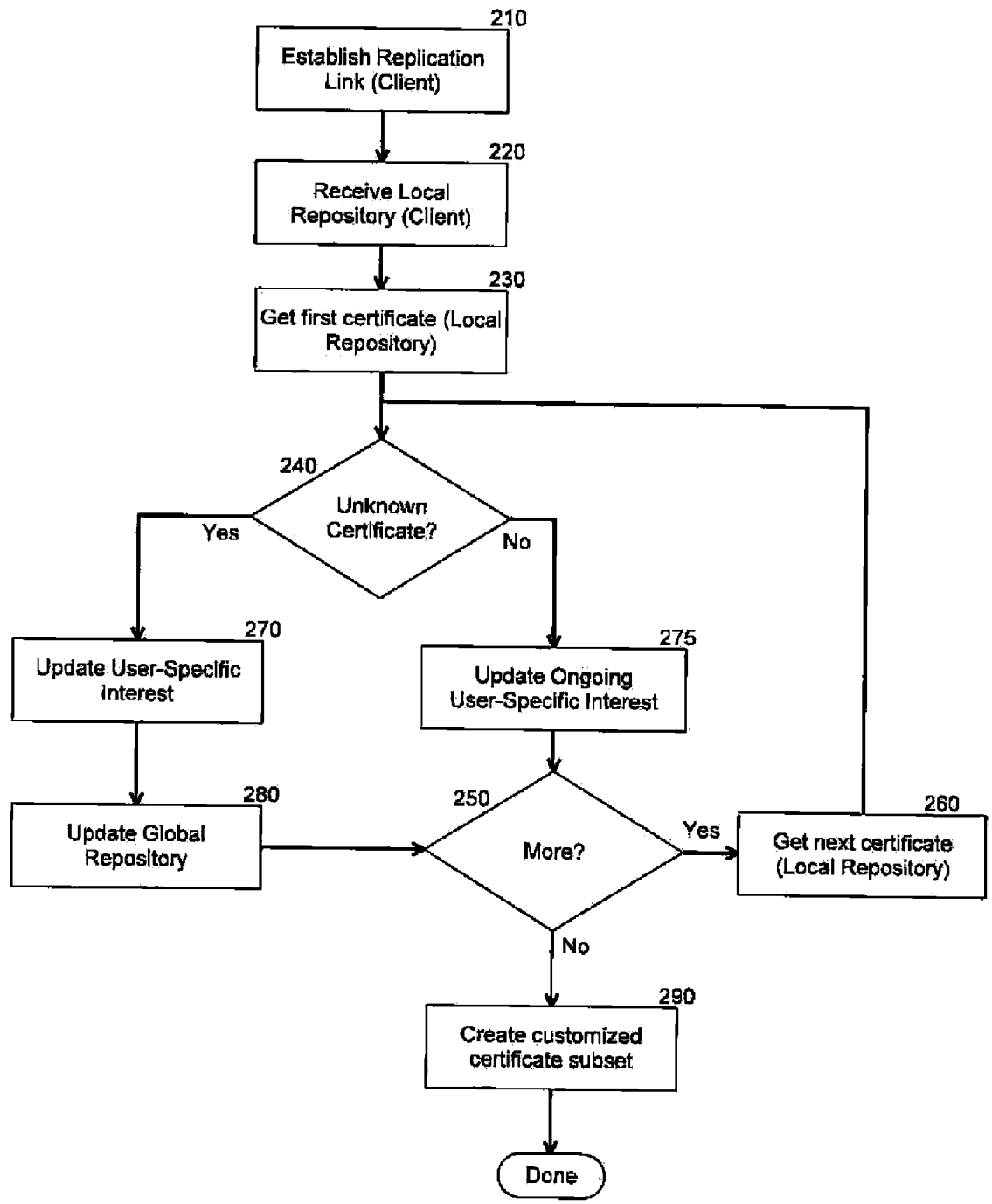

In further illustration of the operation of the certificate subset selection logic 200, FIG. 2 is a flow chart illustrating a process for user-specific certificate subset selection in a user-specific certificate repository replication system. Beginning in block 210, a replication link can be established with a given computing client. In block 220, the host computing platform further can receive the local repository of the computing client which can include usage history of the user-specific interest data for the local repository. In this regard, the local repository can include a client resident repository of unknown certificates associated with untrusted messaging correspondents and populating during message exchange operations between the computing client and third-party messaging clients. Once the host computing platform has received the local repository, in block 230 a first certificate can be retrieved from the local repository.

If in decision block 240, it is determined that the first retrieved certificate is known to already exist in the global untrusted certificate repository, then the user-specific interest data can be updated in block 275 to reflect any actual use of the certificate made by the client, to record an ongoing interest with the correspondent. In decision block 250 it can be determined if any certificates in the local repository remain to be processed. If so, in block 260 a next certificate in the local repository can be retrieved and the process can repeat through decision block 240. For example, if a user begins to increasingly communicate with a given correspondent, it is a likely indication of a higher user-specific interest score for a given correspondent. Likewise, if a user has not been communicating with a given correspondent for a specified period of time, it is a likely indication of a much lower user-specific interest score for a given correspondent.

If in decision block 240, it is determined that the retrieved certificate is unknown, i.e. not currently present in the global repository of untrusted certificates, then the user-specific history associated with the correspondent can be updated to the user-specific interest data in block 270 and the associated certificates can be added to the global repository in block 280 indexed by a given email address.

In decision block 250, when no certificates remain to be processed in the local repository, the process can end with block 290 by creating an updated customized certificate subset according to user-specific interest. As a result, redundancies can be avoided in unnecessarily adding to the global certificate repository several copies of the same certificate by separate users. Elimination of redundantly stored certificates can be based upon the entire content, rather than just the email address since a given email address can have multiple certificates associated with it, including but not limited to certificates for encryption, and different ones for digital signatures.

Further, since the global certificate repository can be indexed by email address, all of the different certificates for the same email address can be treated as a single group for replication and user-specific interest data. Thus, only one copy of user-specific interest data can be maintained per correspondent email address, rather than one for each certificate. Moreover, the addition of a certificate to an email address by any user will cause that certificate to be replicated to all users who have an interest in the correspondent.

The embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain or store the program for use by or in connection with the instruction execution system, apparatus, or device. The medium can be an electronic, magnetic, optical, electromagnetic, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A user-specific certificate repository replication method comprising:

replicating with multiple different messaging systems disposed in correspondingly different computing clients;

retrieving a local repository of untrusted certificates by certificate subset selection logic executing in memory by at least one processor of a host computing platform, from each of the different messaging systems during replication and associating each retrieved local repository with a particular end user;

updating a global repository of untrusted certificates with the untrusted certificates of each local repository while eliminating redundant instances of an untrusted certificate present in different retrieved local repositories.

2. The method of claim 1, further comprising:

tracking user-specific interest data of untrusted certificates for each end user;

receiving a request to replicate from a particular one of the messaging systems;

associating the request for a particular end user;

generating a local repository based upon a tracked user-specific interest data for the particular end user; and, returning the local repository to the particular one of the messaging systems during replication.

3. The method of claim 1, further comprising:

marking one of the untrusted certificates to indicate administratively-specified mandatory replication to a subset of all end users; and, updating each local repository for each of the end users in the subset with replicated additional untrusted certificates based on the marking of administratively-specified mandatory replication.

4. The method of claim 2, further comprising:

determining common matching interests among end users according to the tracked user-specific interest data for each end user; and, updating the local repository for each end user with replicated additional untrusted certificates based on the tracked user-specific interest data for another end user known to have common matching interests.

5. A system for user-specific certificate repository replication comprising:

a plurality of different computing clients, each with at least one processor and memory;

multiple different messaging systems disposed in correspondingly different ones of the computing clients;

a local repository associated with a particular end user;

a host computing platform;

a global certificate repository disposed in the host computing platform;

user-specific interest data disposed in the host computing platform;

certificate subset selection logic disposed in the host computing platform or disposed in each computing client, the certificate subset selection logic configured to create and store a certificate subset of the global certificate repository based upon a tracked user-specific interest data for the particular end user in the host computing platform, and return an updated local repository for the particular end use.

6. The system of claim 5, further comprising:

certificate subset selection logic configured to determine common matching interests among end users according to the tracked user-specific interest data for each end user and, to update the local repository for each end user with replicated additional untrusted certificates based on the tracked user-specific interest data for another end user known to have common matching interests.

7. The system of claim 5, further comprising:

certificate subset selection logic configured to mark one of the untrusted certificates to indicate administratively-specified mandatory replication to a subset of all end users and, to update each local repository for each of the end users in the subset with replicated additional untrusted certificates based on the marking of administratively-specified mandatory replication.

8. A computer program product comprising a non-transitory computer usable storage medium embodying computer usable program code for user-specific certificate repository replication, the computer program product comprising computer usable program code for replicating with multiple different messaging systems disposed in correspondingly different computing clients;

computer usable program code for retrieving a local repository of untrusted certificates from each of the different messaging systems during replication and associating each retrieved local repository with a particular end user;

computer usable program code for updating a global repository of untrusted certificates with the untrusted certificates of each local repository while eliminating redundant instances of an untrusted certificate present in different retrieved local repositories.

9. The computer program product of claim 8, further comprising:

computer usable program code for tracking user-specific interest data of untrusted certificates for each end user;

computer usable program code for receiving a request to replicate from a particular one of the messaging systems;

computer usable program code for associating the request for a particular end user;

computer usable program code for generating a local repository based upon a tracked user-specific interest data for the particular end user; and, computer usable program code for returning the local repository to the particular one of the messaging systems during replication.

10. The computer program product of claim 8, further comprising:

computer usable program code for marking one of the untrusted certificates to indicate administratively-specified mandatory replication to a subset of all end users; and, computer usable program code for updating each local repository for each of the end users in the subset with replicated additional untrusted certificates based on the marking of administratively-specified mandatory replication.

11. The computer program product of claim 9, further comprising:

computer usable program code for determining common matching interests among end users according to the tracked user-specific interest data for each end user; and, computer usable program code for updating the local repository for each end user with replicated additional untrusted certificates based on the tracked user-specific interest data for another end user known to have common matching interests.

* * * * *